(12) United States Patent
Takishima et al.

(10) Patent No.: US 6,404,715 B1
(45) Date of Patent: Jun. 11, 2002

(54) DETECTING SYSTEM FOR DETECTING ROTATION ANGLE OF DEFLECTION MIRROR

(75) Inventors: Suguru Takishima; Hirotaka Fujii, both of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/166,092

(22) Filed: Oct. 5, 1998

(30) Foreign Application Priority Data

Oct. 6, 1997 (JP) .............................................. 9-289060

(51) Int. Cl.[7] .................................................. G11B 7/00
(52) U.S. Cl. .................................. 369/53.26; 369/53.28
(58) Field of Search ........................... 369/44.32, 53.19, 369/53.26, 53.28, 44.23

(56) References Cited

U.S. PATENT DOCUMENTS

| 2,750,461 A | 6/1956 | Bunch |
| 3,244,917 A | 4/1966 | Gute |
| 3,354,833 A | 11/1967 | Laing |
| 4,088,914 A | 5/1978 | Aoki |
| 4,126,796 A | 11/1978 | Ito |
| 4,206,379 A | 6/1980 | Onda |
| 4,285,566 A | 8/1981 | Yamamoto |
| 4,297,713 A | 10/1981 | Ichikawa et al. |
| 4,351,596 A | 9/1982 | Ohniwa et al. |
| 4,466,088 A | 8/1984 | Trethewey |

(List continued on next page.)

FOREIGN PATENT DOCUMENTS

| EP | 0084727 | 8/1983 |
| EP | 0084728 | 8/1983 |
| EP | 0448362 | 9/1991 |
| EP | 0790512 | 8/1997 |
| EP | 097163 | 4/1999 |

(List continued on next page.)

OTHER PUBLICATIONS

An article by B.D. Terris et al., entitled "Near–Field Optical Data Storage", Applied Physics Letters, vol. 68, pp. 141–143, Jan. 8, 1996.
Patent Abstracts of Japan, vol. 012, No. 140 (P–696), dated Apr. 28, 1988.
Patent Abstracts of Japan, vol. 017, No. 505 (P–1611), dated Sep. 10, 1993.
An article entitled "Optical Magnetic Disk Device Of U.S. TeraStor Succeeds Tracking Control—Track Pitch Of 0.34 $\mu$m Realized Using Two–Stage Servo", which appeared at pages 13 and 14 of the Japanese language magazine *Nikkei Electronics,* Sep. 22, 1997 (No. 699).

(List continued on next page.)

*Primary Examiner*—W. R. Young
(74) *Attorney, Agent, or Firm*—Greenblum & Bernstein, P.L.C.

(57) ABSTRACT

A detecting system for detecting a rotation angle of a deflecting mirror is disclosed. The detecting system is provided with a laser diode, an objective lens, and a deflection mirror therebetween. The deflection mirror is rotatable about a predetermined rotation axis to change the position, on an optical disc, at which a laser beam emitted by the laser diode is incident. Further, a beam splitter is provided to split the light beam into a first beam directed to the optical disc via the deflection mirror, and a second beam that is directed to a reflection surface of the deflection mirror. The second beam reflected by the reflection member is not directed to the optical disc but received by a detector which determines the rotation angle of the deflection mirror in accordance with the received second beam.

20 Claims, 5 Drawing Sheets

U.S. PATENT DOCUMENTS

| | | | |
|---|---|---|---|
| 4,891,998 A | 1/1990 | Tourville | |
| 4,959,824 A | 9/1990 | Ueda | |
| 4,968,876 A | 11/1990 | Iima | |
| 5,125,750 A | 6/1992 | Corle et al. | |
| 5,126,899 A | 6/1992 | Kanazawa | |
| 5,136,559 A | 8/1992 | Nakayama | |
| 5,151,890 A | 9/1992 | Yonekubo | |
| 5,220,550 A | 6/1993 | Nakayama | |
| 5,254,893 A | 10/1993 | Ide | |
| 5,365,504 A | 11/1994 | Noguchi | |
| 5,420,848 A | 5/1995 | Date et al. | |
| 5,422,872 A | 6/1995 | Hsu et al. | |
| 5,444,683 A | 8/1995 | Ishikawa | |
| 5,461,498 A | 10/1995 | Iwao | |
| 5,517,474 A | 5/1996 | Takamine | |
| 5,532,480 A | 7/1996 | Scofield | |
| 5,564,585 A | 10/1996 | Saitoh | |
| 5,596,446 A | 1/1997 | Plesko | |
| 5,608,280 A | 3/1997 | Tamemoto et al. | |
| 5,610,752 A | 3/1997 | Hayakawa | |
| 5,625,244 A | 4/1997 | Bradfield | |
| 5,684,762 A | 11/1997 | Kubo | |
| 5,705,868 A | 1/1998 | Cox et al. | |
| 5,719,834 A | 2/1998 | Futagawa et al. | |
| 5,764,613 A | 6/1998 | Yamamoto | |
| 5,768,241 A | 6/1998 | Kanazawa et al. | |
| 5,844,676 A | 12/1998 | Southam et al. | |
| 5,886,438 A | 3/1999 | Kawanishi | |
| 5,920,140 A | 7/1999 | Nakagishi et al. | |

FOREIGN PATENT DOCUMENTS

| | | |
|---|---|---|
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |
| JP | 62-262017 | 11/1987 |
| JP | 64-2015 | 1/1989 |
| JP | 5-128561 | 5/1993 |
| JP | 8-315404 | 11/1996 |
| WO | 90/08363 | 7/1990 |
| WO | 98/06095 | 2/1998 |
| WO | 98/49675 | 11/1998 |
| WO | 98/49684 | 11/1998 |

OTHER PUBLICATIONS

An article entitled "Trillions Of Bytes", by Eric Nee, which appeared in the Mar. 24, 1997 issue of Forbes magazine.

A screen capture of a page from TeraStor's website (dated Mar. 19, 1997) entitled "Architecture of TeraStor's Near–Field Technology".

An article entitled "In 1998, 10 GB Per Inch$^2$ Is Realized Using New Optical Recording Technology", appeared at pp. 148–151 of the Sep. 1997 Japanese language edition of Nikkei Byte magazine.

DETECTING SYSTEM FOR DETECTING ROTATION ANGLE OF DEFLECTION MIRROR

BACKGROUND OF THE INVENTION

The present invention relates to a system for detecting a rotation angle of a deflection mirror.

Conventionally, an optical data recording/reproducing device for recording/reproducing optical data on/from an optical disc using an optical head. When the optical data is read, a laser beam emitted by a laser diode is converged on the optical disc by an optical system, and a reflected beam is received by a light receiving element. When the data is read, the optical head is moved in a radial direction to follow a track formed on the optical disc.

Since the disc spins at a relatively high speed, and the center of a circle defined by the tracks may be displaced from the center of spin, it is relatively difficult to move the entire optical head to accurately follow the tracks.

In order to accurately adjust the position of the optical head with respect to a track, in a conventional device, the beam incident on an objective lens of the optical head is made inclined. For this purpose, an optical system employing a deflection mirror has been suggested. In such a system, the deflection mirror is provided within an optical path between the laser diode and the objective lens. When the deflection mirror rotates about its rotation axis, the direction in which the beam is incident on the objective lens is changed. Accordingly, by controlling the rotation angle of the deflection mirror, the position of the beam spot on the optical disc can be adjusted. That is, by moving the optical head to roughly locate the beam spot in the vicinity of a target track (i.e., a primary tracking is performed), and then by driving the deflection mirror, tracking position is adjusted accurately (i.e., a fine tracking is performed). In such a system, when the primary tracking is performed, the deflection mirror is positioned at its reference or neutral position, and when the fine tracking is performed, the rotation angle of the deflection mirror with respect to the reference position is controlled. Generally, by rotating the deflection mirror, the beam spot moves across from several tracks to several tens of tracks (i.e., several micrometers).

In such a system, however, if the deflection mirror is rotated to a position out of a predetermined rage, optical performance of the disc drive may be deteriorated. Thus, the rotation angle of the deflection mirror should be monitored and controlled so that the rotation angle of the deflection mirror does not exceeds a predetermined angular range.

For detecting the rotation angle of the deflection mirror, a rotation angle detecting system is provided. An example of such a system is provided with a light emitting element and a pair of light receiving elements. In such a system, light is projected onto a surface which is different from a reflection surface of the deflection mirror, and light reflected thereby is received by a pair of light receiving elements. By comparing the output signals of the pair of light receiving elements, the rotation angle can be detected. If such a detection system is used, however, two light sources are necessary. That is, a light source used for reading/writing data, and another light source used for detecting the rotation angle of the deflection mirror should be provided. Therefore, if such a system is employed in an optical disc drive, the size thereof becomes relatively large, and a manufacturing cost may also increase.

SUMMARY OF THE INVENTION

It is therefore an object of the invention to provide an improved rotation angle detection system for detecting a rotation angle of a deflection mirror provided in an optical head of an optical disc drive.

For the object, according to the invention, there is provided a rotation angle detecting system for detecting a rotation angle of a deflection mirror employed in an optical disc drive. The rotation angle detecting system is provided with: a light source that emits a light beam to be incident on an optical disc; a reflection member provided on the deflection mirror; a beam splitter that splits the beam emitted by the light source into a first beam directed to the optical disc via the deflection mirror and a second beam directed to the reflection member; and a detector that receives the second beam reflected by the reflection member and determines the rotation angle of the deflection mirror in accordance with the second beam.

Since the light beam which is to be converged on the optical disc is split and used for detecting the rotation angle of the deflection mirror, another light source to be used only for detecting the rotation angle of the deflection mirror is not necessary.

Preferably, the reflection member comprises a portion of a reflection surface of the deflection mirror. In this case, an another reflection member only for detecting the rotation angle of the deflection mirror is not necessary.

Optionally, the detector may be a single element including two light receiving areas, each of the two light receiving areas outputting signal representing amount of received light, the two light receiving areas being arranged in a direction where the second beam incident on the two light receiving areas moves when the deflection mirror rotates. The detector determines the rotation angle of the deflection mirror based on the output signals of the two light receiving areas.

Particularly, the detector may be a photodiode having two light receiving areas.

Optionally, the beam splitter may be a beam splitting prism, a half-mirror surface being formed inside the beam splitting prism. In this case, the first beam may pass through the half-mirror surface, and the second beam may be reflected thereby.

Further optionally, the light source may be provided with a laser diode emitting a diverging laser beam having an elliptical cross section; and a collimator lens that converts the diverging laser beam into a parallel laser beam. In this case, a surface of the beam splitting prism on which the light beam emitted by the laser diode is incident is inclined with respect to an optical path of the incident laser beam so that the first beam has a circular cross section. In other words, the beam splitting prism also functions as a beam shaping prism.

In particular case, the beam splitting prism may be constituted such that the second beam is reflected a plurality of times inside the beam splitting prism.

Still optionally, the detector detects the rotation angle of the deflection mirror in accordance with a difference between the output signals of the two light receiving areas.

Yet optionally, the detector may detect an intensity of the light beam emitted by the light source in accordance with a sum of the output signals of the two light receiving areas.

In this case, the optical disc drive may be provided with a controller that adjusts the intensity of the light beam emitted by the light source in accordance with the intensity of the light beam detected by the detector. Thus, with use of a single detector, both the rotation angle of the deflection mirror and the intensity of the light beam can be detected.

According to another aspect of the invention, there is provided a head of an optical disc drive, which is provided with: a light source that emits a light beam; an objective optical system that receives the light beam emitted by the light source, the light beam passed through the objective optical system being converged onto an optical disc; a deflection mirror provided between the light source and the objective optical system, the deflection mirror being rotatable about a predetermined rotation axis, the light beam emitted by the light source being incident on a reflection surface of the deflection mirror and reflected towards the objective optical system; a reflection member provided on the deflection mirror; a beam splitter that splits the light beam emitted by the light source into a first beam that is directed to the optical disc via the deflection mirror and a second beam that is directed to the reflection member; and a detector that receives the second beam split by the beam splitter and reflected by the reflection member, the detector determining the rotation angle of the deflection mirror in accordance with the received second beam.

DESCRIPTION OF THE ACCOMPANYING DRAWINGS

DESCRIPTION OF THE EMBODIMENTS

The present invention will be described with reference to the drawings.

Figure 1:
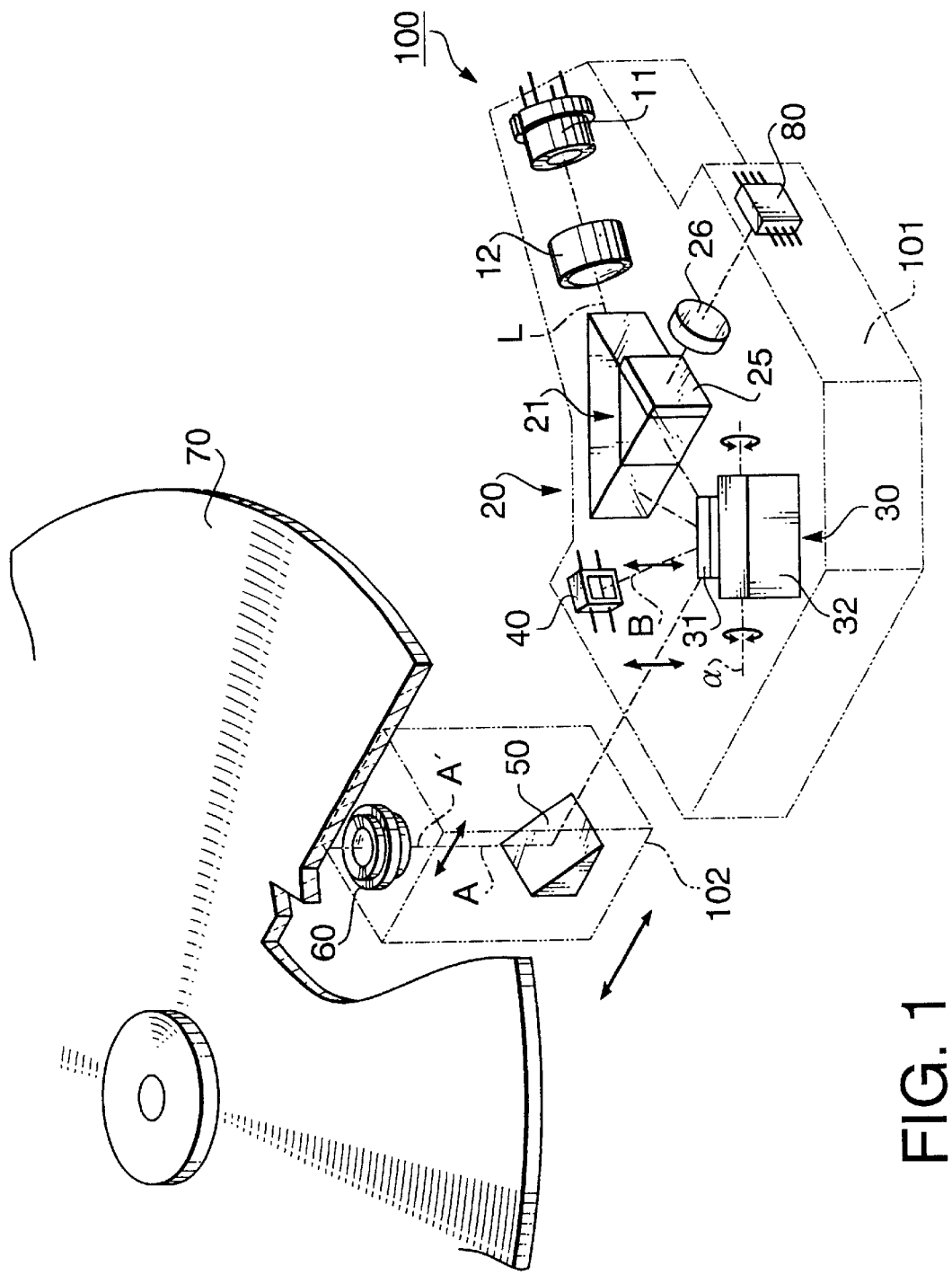
FIG. 1 is a perspective view of an optical system of an optical data recording/reproducing device according to a first embodiment of the invention.
Figure 2:
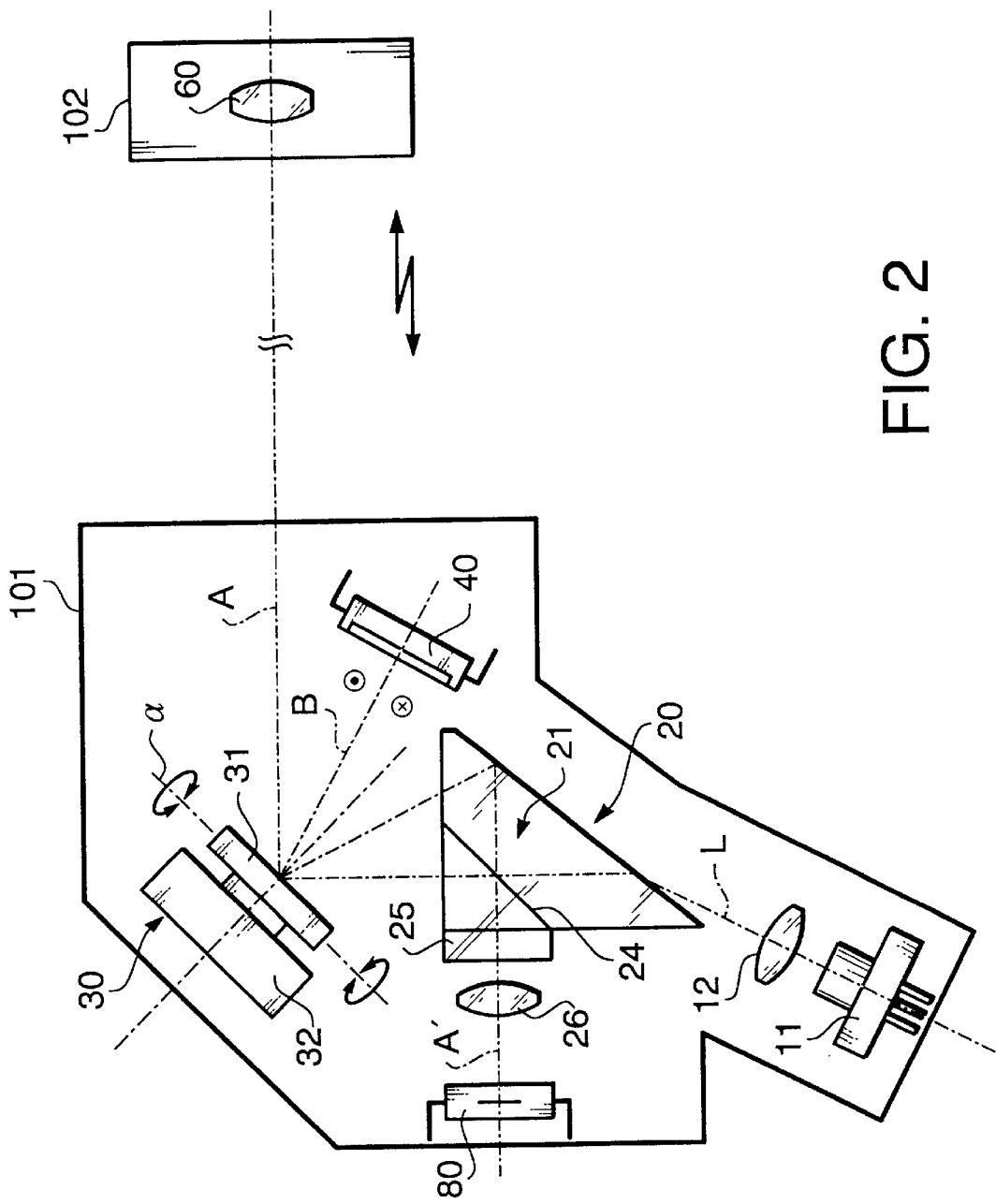
FIG. 2 is a plan view of the optical system according to a first embodiment of the invention.

FIG. 1 is a perspective view of an optical system 100 of a magneto-optical disc drive of a data recording/reproducing device, and FIG. 2 is a plan view of the optical system 100 according to a first embodiment of the invention.

The optical system 100 includes a stationary unit 101 and a movable unit 102. On the stationary unit 101, a laser diode 11, a collimator lens 12, a beam splitter 20, a deflection mirror unit 30 are mounted. On the movable unit 102, a reflection prism 50 and an objective lens 60 are provided. The laser diode 11 emits a diverging laser beam having an elliptical cross section. The laser beam is made into a parallel light beam L by the collimator lens 12. The parallel light beam L is incident on the beam splitter 20, which is composed of a beam split prism 21, a Wollaston prism 25, and a collecting lens 26. It should be noted that the beam emitted by the laser diode 11 have an elliptical cross section, which is converted into a circular cross section as the beam is incident on the surface which is inclined with respect to the incident beam.

By rotating the deflection mirror unit 30, an incident angle of the beam incident on the objective lens 60 is changed, thereby a beam spot formed on the optical disc 70 is moved. Specifically, by moving the movable unit 102, the primary tracking operation is used to locate a beam spot in the vicinity of a desired track. Then, by rotating the deflection mirror unit 30, the position of the beam spot is adjusted (i.e., the fine tracking is performed). It should be noted that, if the desired track is relatively close to the track on which the beam spot is currently located, the beam spot may be moved to the desired track only by rotating the deflection mirror unit 30.

The incident angle of the beam which is incident on the deflection mirror unit 30 varies depending on the rotational position of the deflection mirror 30. If the incident angle is too great, an optical performance of the entire system may be deteriorated. To avoid this problem, in the first embodiment, the rotation angle of the deflection mirror unit 30 is monitored, and if the rotation angle exceeds a predetermined range, instead of rotating the deflection mirror unit 30, the movable unit 102 is moved by an amount corresponding to the rotation amount of the deflection mirror unit 30. Thereafter, if necessary, a further fine tracking operation is performed by rotating the deflection mirror.

The beam L incident on the beam split prism 21 is split into two beams: a first beam A which passes through a beam splitting surface 24 of the beam split prism 21, is reflected by a deflection mirror surface 31 of the deflection mirror unit 30. The beam reflected by the deflection mirror surface 31 is reflected by the reflection prism 50 and converges on a optical disc 70 by the objective lens 60. A reflected beam A', which is reflected by the optical disc 70, returns the same optical path in an opposite direction and reaches the deflection mirror 31, and is incident on the beam split prism 21. The reflected beam A' is then reflected by the beam splitting surface 24, and passes through the Wollaston prism 25, which divides the incident beam into a beam for detecting a servo signal (which will be described later), and a beam for detecting a data signal. The two beams pass through the collecting lens 26 and are incident on the photo sensor 80. The photo sensor 80 performs photoelectric conversion, and outputs the servo signal and the data signal in accordance with the received beams. The servo signal consists of a focusing error signal and a tracking error signal respectively representing error signals with respect target positions.

The objective lens 60 is driven by a not-shown driving device based on the focusing error signal so that the focusing condition of a beam spot formed on the optical disc 70 is adjusted. The deflection mirror 31 is driven to rotate in accordance with the tracking error signal to control a position of the beam spot on the disc 70 in the radial direction thereof.

The beam B, i.e., another beam, which is generated by splitting the beam emitted by the laser diode 11 with use of the beam splitter 20, is reflected by the deflection mirror 31 and incident on a sensor 40 for detecting the rotation angle of the deflection mirror 31.

In the first embodiment, the deflection mirror 31 is constituted to rotate about an axis α which is parallel with a surface of the optical disc 70. Accordingly, as the deflection mirror 31 rotates, the beam A directed from the deflection mirror 31 to the reflection prism 50 is deflected substantially in a plane perpendicular to the surface of the optical disc 70. It should be noted that a line formed where the plane intersects the optical disc 70 extends in the radial direction of the optical disc 70. Further, the movable unit 102 moves on the plane on which the beam A is deflected. The beam A is reflected by the reflection prism 50 and proceeds in a direction perpendicular to a direction in which the beam A is incident on the reflection prism 50, and accordingly the beam incident on the objective lens 60 is deflected substantially in the radial direction of the optical disc 70.

Figure 3:
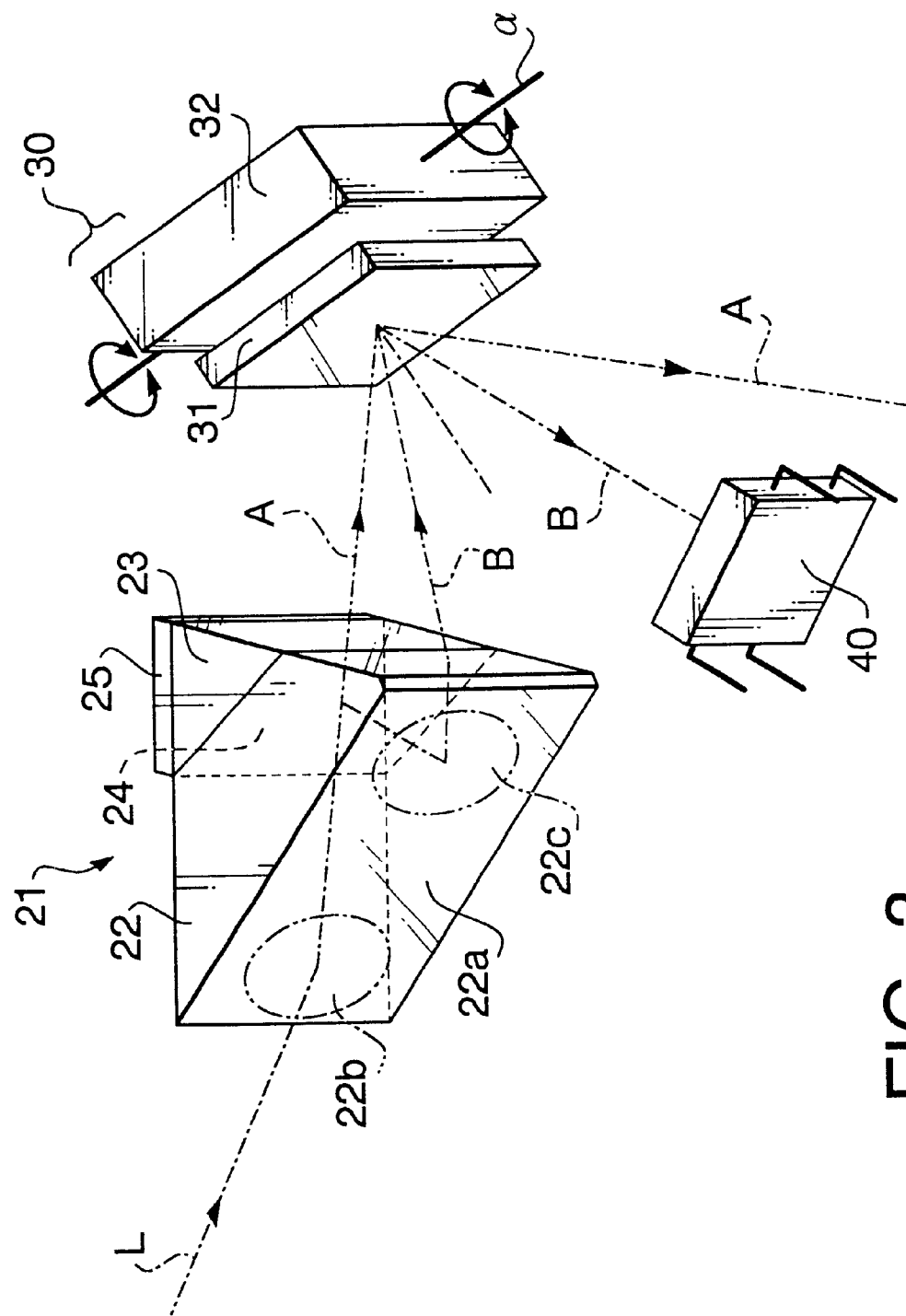
FIG. 3 is a perspective view of a rotation angle detecting system for detecting the rotation angle of a deflection mirror.

FIG. 3 is an enlarged view showing the beam split prism 21, the deflection mirror unit 30 and the sensor 40. The beam split prism 21 has an anamorphic prism 22 and a triangular prism 23. A surface at which the anamorphic prism 22 and the triangular prism 23 are adhered is formed as the beam splitting surface 24, which is a half-mirror surface.

A surface 22a of the anamorphic prism 22 on which the beam L is incident has a transparent area 22b on which a transmission coating for improving transmissivity is applied, and a reflective area 22c on which a reflection coating is applied. The deflection mirror unit 30 includes a mirror driving device 32 which drives the deflection mirror 31 to rotate about the axis α.

The beam L passes through the transmission area 22b, and then, by the beam splitting surface 24, is divided into the first beam A and the second beam B. The beam passes through the beam splitting surface 24 is directed to the deflection mirror 31 as the first beam A. The beam reflected by the beam splitting surface 24, which is the second beam B, is further reflected by the reflection area 22c, and is directed to the deflecting surface 31. As shown in FIG. 3, the first beam A and the second beam B are incident on the deflecting surface 31 at different incident angles. The first beam A is reflected by the deflecting surface 31 and is directed to the optical disc 70 via the objective lens 60 as described above (see FIGS. 1 and 2). The second beam B is reflected by the deflecting surface 31 and is directed to the sensor 40.

As afore-mentioned, the cross section of the beam L directed to the anamorphic prism 22 has the elliptical shape. Since the beam L is incident on the surface 22a as inclined, and the beam L is incident on the surface 22a so that the shorter axis of the elliptical cross section is expanded by the surface 22a, the beam emerged from the anamorphic prism 22 has a circular shape. Thus, even though beam splitter 20 is provided between the laser diode 11 and the objective lens 60, the beam A, which is incident on the objective lens 60, is a parallel beam having a circular cross section.

Figure 4:
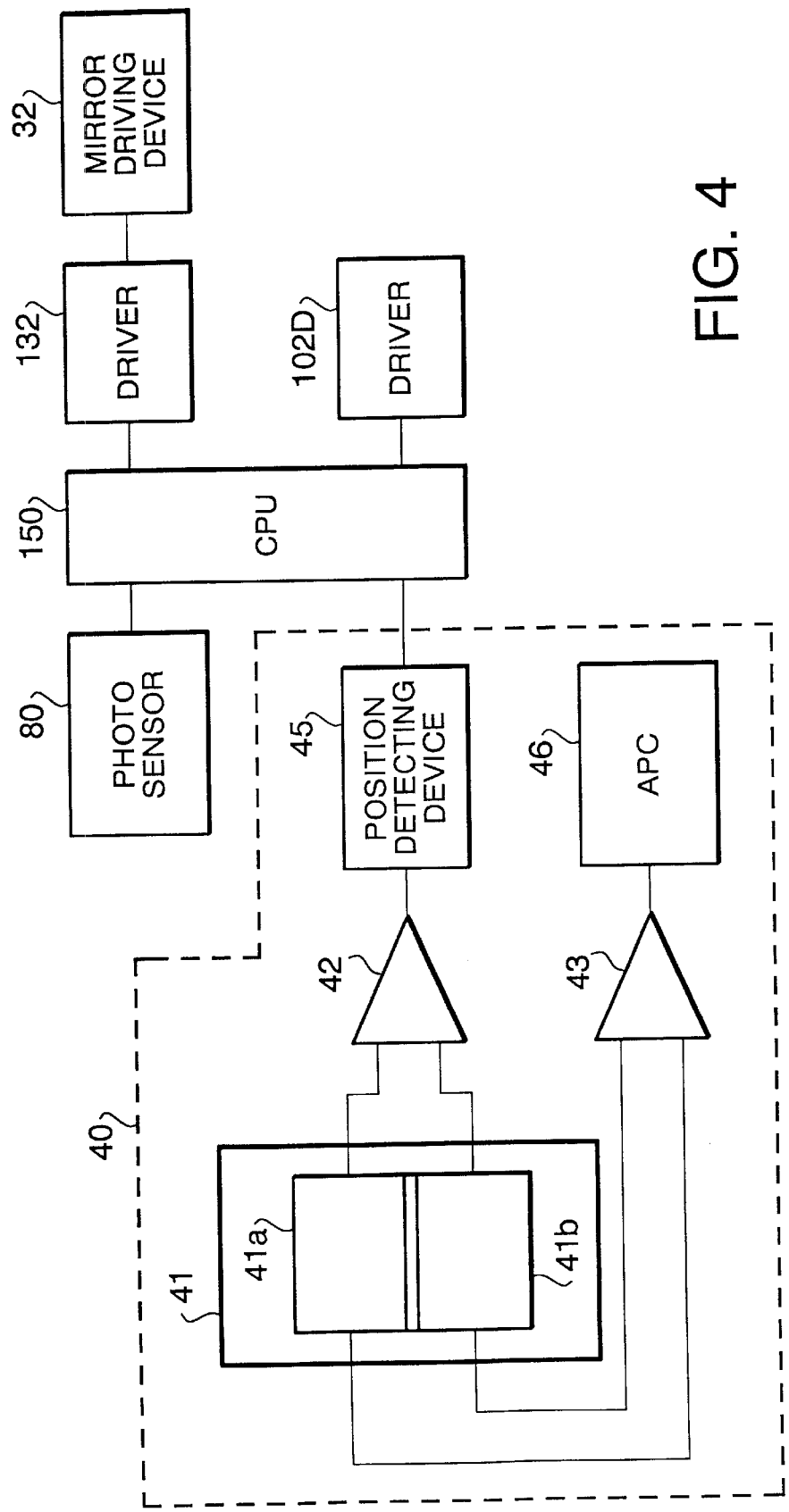
FIG. 4 shows a circuit for photo sensors of the rotation angle detecting system shown in FIG. 3.

FIG. 4 is a block diagram illustrating a circuit, including the sensor 40, for executing the tracking operation. The sensor 40 includes a photo diode 41, a differential amplifier 42, an adder 43, a position detecting device 45 and an APC (Automatic Power Control) unit 46. In the circuit, the photodiode 41 has two separate light receiving areas: a first area 41a; and a second area 41b. The first and second areas 41a and 41b are arranged in a direction in which the first beam A directed from the deflection mirror 31 to the reflection prism 50 is deflected (i.e., in a direction perpendicular to the rotation axis α of the deflection surface 31. The photodiode 41 outputs a first and a second signals representing the amount of light received by the first and the second areas 41a and 41b. In this embodiment, the first and second areas 41a and 41b are positioned such that when the deflection mirror 31 is positioned at its neutral position, the second beam B is evenly incident on the first and second areas 41a and 41b.

As shown in FIG. 4, the first and second areas 41a and 41b are connected to the differential amplifier 42, and the adder 43, respectively. Thus, a signal representing difference of the amounts of light incident on the first and second areas 41a and 41b is output from the differential amplifier 42, and a signal representing the amount of the second beam B is output from the adder 43.

The differential amplifier 42 is connected to a position detecting device 45 which detects the rotating position (or angle) of the deflection mirror 31 in accordance with the output of the differential amplifier 42. The detected rotational position of the deflection mirror 31 is transmitted to a CPU (Central Processing Device) 150. Based on the detected rotating position of the deflection mirror 31 and the tracking error signal output by the photo sensor 80, the CPU 150 calculates a resultant rotation angle, which is an angle of the deflection mirror 31 when rotated to adjust the position of the beam spot.

If the resultant rotation angle is not greater than a predetermined allowable angular range, the CPU 150 controls the mirror driving device 32 to rotate the deflection mirror 31 so that the beam spot is directed on a desired one of the tracks of the optical disc 70 accurately. If the resultant rotation angle is greater than the predetermined allowable angular range, the CPU 150 converts the resultant rotation angle into an amount of movement of the movable unit 102, and controls a driver 102D of the movable unit 102 to move the movable unit 102 instead of rotating the deflection mirror 31. As a result of movement of the movable unit 102, the beam spot is located on the desired track and the deflection mirror 31 is located at the neutral position, i.e., a center of the allowable angular range. Thereafter, if necessary, a further fine tracking operation for locating the beam spot accurately on the desired track is executed.

The adder 43 is connected to the APC unit 46. The output of the adder 43 represent the amount of light of the beam B which is proportional to the amount of light emitted by the laser diode 11. Therefore, based on the output of the adder 43, the APC unit 46 controls the amount of light emitted by the laser diode 11.

Figure 5:
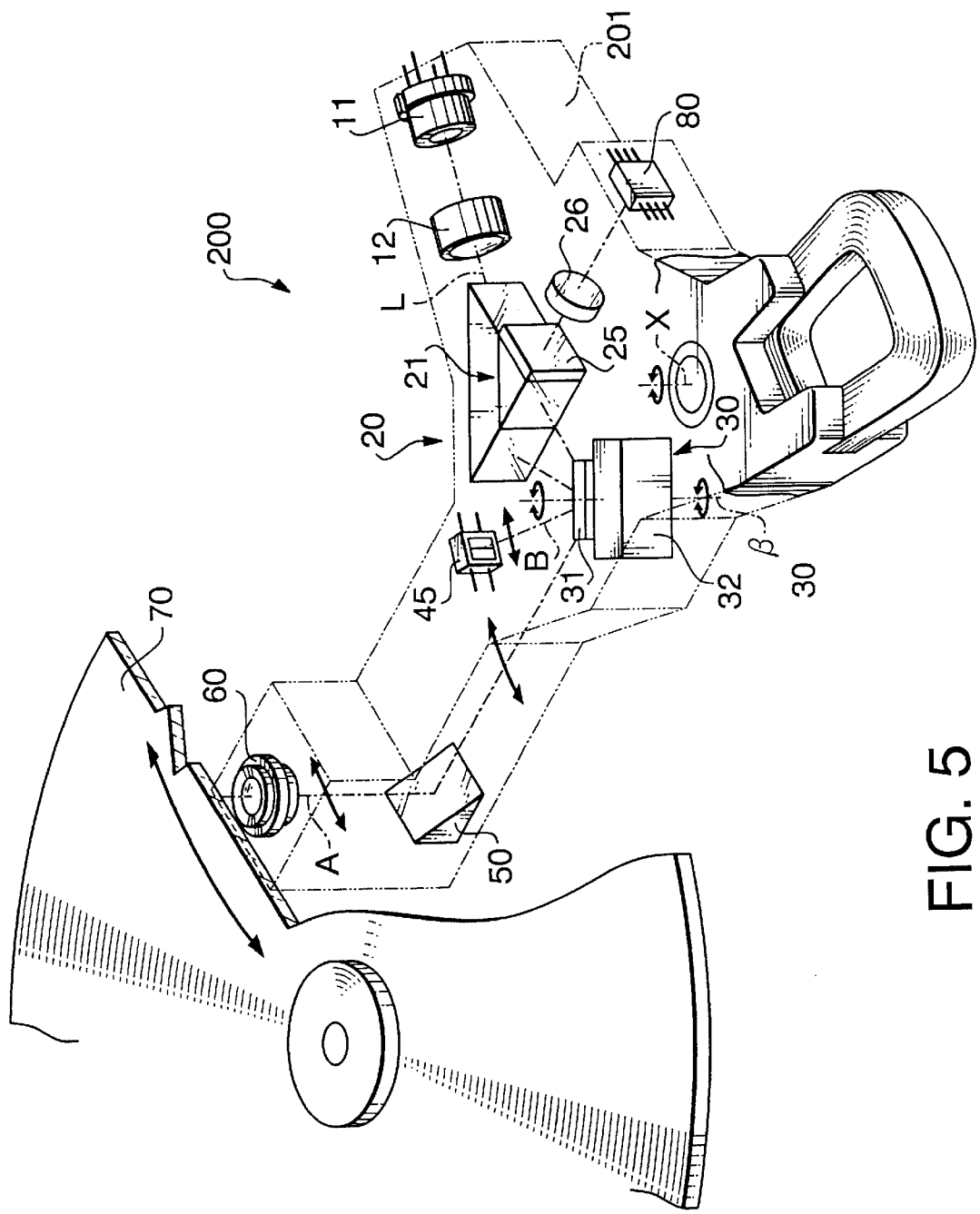
FIG. 5 is a plan view of the optical system according to a second embodiment of the invention.

FIG. 5 shows a perspective view of the optical system 200 of the optical data recording/reproducing device according to the second embodiment of the invention. In the drawing, the same reference numerals are assigned to the elements similar to those employed in the first embodiment.

In the second embodiment, the optical system 200 is mounted on a rotatable unit 201. The rotatable unit 201 is made rotatable about an axis X which is perpendicular to the surface of the optical disc 70 such that the beam spot on the optical disc 70 moves substantially in the radial direction as the rotatable unit 201 rotates. In the optical system 200, the deflection mirror 31 is arranged to be rotatable about an axis β which is perpendicular to the surface of the optical disc 70. Therefore, as the deflection mirror 31 rotates, the first beam A directed from the deflection mirror 31 to the reflection prism 50 is deflected in a plane parallel to the surface of the optical disc 70. As shown in FIG. 5, the first beam A, which is reflected by the reflection prism 50 and incident on the objective lens 60, is deflected in the radial direction of the optical disc 70. Further, in this embodiment, a sensor 45 for detecting the rotating position of the deflection mirror 31 has a first and second areas which are arranged along the direction which is parallel to the surface of the optical disc 70, i.e., in a direction perpendicular to the rotation axis β of the deflection mirror 31. When the deflection mirror 31 is located at its neutral position, the center of the beam B intersects the boundary between the first and second light receiving areas, i.e., the beam B is incident evenly on the first and second light receiving areas. The output signals of the first and second light receiving areas are processed as in the first embodiment, the rotation angle of the deflection mirror 31 is detected and controlled. Further, the intensity of beam emitted by the laser diode 11 is also controlled similarly to the first embodiment.

In the above-described embodiments, in order to detect the rotation angle of the deflection mirror, the split beam is incident on the reflection surface of the galvano mirror. However, the invention is not limited to this configuration. If a reflection member is provided on a portion of the galvano mirror (i.e., a rotatable portion thereof), the beam incident on and reflected by the reflection member can be used for detecting the rotation angle of the galvano mirror.

As described above, according to the present invention, the rotation angle of the deflection mirror can be detected using the laser diode for emitting the laser beam to be directed to the optical disc. Since the laser diode is used for detecting the rotation angle of the deflection mirror and for reading/writing data from/onto the optical disc, the optical disc drive can be made compact, and inexpensive.

The present disclosure relates to subject matter contained in Japanese Patent Applications Nos. HEI 09-289060, filed on Oct. 6, 1997, which is expressly incorporated herein by reference in its entirety.

What is claimed is:

1. A rotation angle detecting system for detecting a rotation angle of a deflection mirror employed in an optical disc drive, said optical drive having a light source that emits a light beam to be incident on an optical disc, said rotation angle detecting system comprising:
    a reflection member provided on said deflection mirror;
    a beam splitter that splits said beam emitted by said light source into a first beam directed to said optical disc via said deflection mirror and a second beam directed to said reflection member, said beam splitter having a surface with a transparent area that passes said first beam and a reflective area that reflects said second beam; and
    a detector that receives said second beam reflected by said reflection member and determines the rotation angle of said deflection mirror in accordance with said second beam.

2. The rotation angle detection system according to claim 1, wherein said reflection member comprises a portion of a reflection surface of said deflection mirror.

3. The rotation angle detection system according to claim 1, wherein said detector includes two light receiving areas, each of said two light receiving areas outputting signal representing amount of received light, said two light receiving areas being arranged in a direction where said second beam incident on said two light receiving areas moves when said deflection mirror rotates, said detector determines the rotation angle of said deflection mirror based on the output signals of said two light receiving areas.

4. The rotation angle detecting system according to claim 2, wherein said detector comprises a photodiode having two light receiving areas.

5. The rotation angle detecting system according to claim 2, wherein said beam splitter includes a beam splitting prism, a half-mirror surface being formed inside said beam splitting prism.

6. The rotation angle detecting system according to claim 5, wherein said light source comprises:
    a laser diode emitting a diverging laser beam having an elliptical cross section; and
    a collimator lens that converts said diverging laser beam into a parallel laser beam, and
    wherein a surface of said beam splitting prism on which said light beam emitted by said laser diode is incident is inclined with respect to an optical path of the incident laser beam so that said first beam has a circular cross section.

7. The rotation angle detecting system according to claim 5, wherein said second beam is reflected a plurality of times inside said beam splitting prism.

8. The rotation angle detecting system according to claim 2, wherein said detector detects the rotation angle of said deflection mirror in accordance with a difference between the output signals of two light receiving areas.

9. The rotation angle detecting system according to claim 8, wherein said detector detects an intensity of the light beam emitted by said light source in accordance with a sum of the output signals of said two light receiving areas.

10. The rotation angle detecting system according to claim 9, further comprises a controller that adjusts the intensity of the light beam emitted by said light source in accordance with the intensity of the light beam detected by said detector.

11. A head of an optical disc drive, comprising:
    a light source that emits a light beam;
    an objective optical system that receives said light beam emitted by said light source, the light beam passed through said objective optical system being converged onto an optical disc;
    a deflection mirror provided between said light source and said objective optical system, said deflection mirror being rotatable about a predetermined rotation axis, the light beam emitted by said light source being incident on a reflection surface of said deflection mirror and reflected towards said objective optical system;
    a reflection member provided on said deflection mirror;
    a beam splitter that splits the light beam emitted by said light source onto a first beam that is directed to said optical disc via said deflection mirror and a second beam that is directed to said reflection mirror, a surface of said beam splitter having a transparent area that passes said first beam, and a reflective area that reflective area that reflects said second beam; and
    a detector that receives said second beam split by said beam splitter and reflected by said reflection member, said detector determining the rotational angle of said deflection mirror in accordance with the received second beam.

12. The head according to claim 11, wherein said reflection member comprises a portion of said reflection surface of said deflection mirror.

13. The head according to claim 11, wherein said detector includes two light receiving areas, each of said two light receiving areas outputting signal representing amount of received light, said two light receiving areas being arranged in a direction where said second beam incident on said two light receiving areas moves when said deflection mirror rotates, said detector determines the rotation angle of said deflection mirror based on the output signals of said two light receiving areas.

14. The head according to claim 12, wherein said detector comprises a photodiode having two light receiving areas.

15. The head according to claim 12, wherein said beam splitter includes a beam splitting prism, a half-mirror surface being formed inside said beam splitting prism, said first beam passing through said half-mirror surface, and said second beam being reflected by said half-mirror surface.

16. The head according to claim 15, wherein said light source comprises:
    a laser diode emitting a diverging laser beam having an elliptical cross section; and
    a collimator lens that converts said diverging laser beam into a parallel laser beam, and
    wherein a surface of said beam splitting prism on which said light beam emitted by said laser diode is incident is inclined with respect to an optical path of the incident laser beam so that said first beam has a circular cross section.

17. The head according to claim 15, wherein said second beam is reflected a plurality of times inside said beam splitting prism.

18. The head according to claim 12, wherein said detector detects the rotation angle of said deflection mirror in accordance with a difference between the output signals of two light receiving areas.

19. The head according to claim 18, wherein said detector detects an intensity of the light beam emitted by said light source in accordance with a sum of the output signals of said two light receiving areas.

20. The head according to claim 19, further comprises a controller that adjusts the intensity of the light beam emitted by said light source in accordance with the intensity of the light beam detected by said detector.

* * * * *